Figure 1:
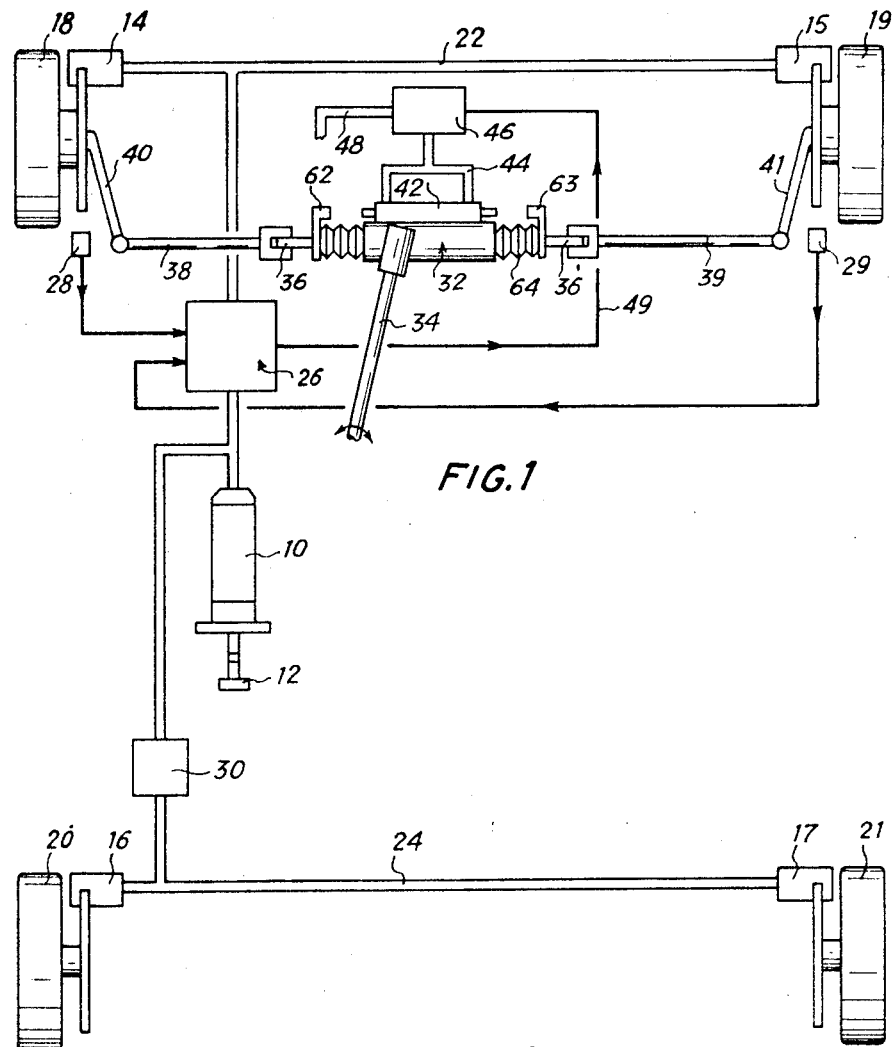

United States Patent [19]
Rivolier

[11] 3,734,228
[45] May 22, 1973

[54] STEERING MECHANISM FOR A ROAD VEHICLE

[75] Inventor: Charles Rivolier, 77-Cesson, France

[73] Assignee: Societe Anonyme D.B.A.

[22] Filed: Apr. 5, 1971

[21] Appl. No.: 131,199

[30] Foreign Application Priority Data

Apr. 17, 1970 France................................7013961

[52] U.S. Cl...................................180/82 R, 280/90
[51] Int. Cl. ............................................B62d 15/00
[58] Field of Search.......................180/82, 103, 79.2, 180/79.1; 280/90, 89, 87, 95, 94; 303/21 F, 24 R

[56] References Cited

UNITED STATES PATENTS

| 2,096,650 | 10/1937 | Del Rio | 280/94 |
| 2,690,916 | 10/1954 | Gilliam | 180/79.2 R |
| 3,554,612 | 1/1971 | Harned | 303/21 F |
| 3,049,938 | 8/1962 | Hulten et al. | 180/79.2 R X |
| 3,432,211 | 3/1969 | Sawan | 180/82 X |
| 3,171,298 | 3/1965 | Henry-Biabaud | 280/90 X |

*Primary Examiner*—Kenneth H. Betts
*Attorney*—W. N. Antonis and Plante, Hartz, Smith & Thompson

[57] ABSTRACT

Wheel angular displacement limiting device for a road vehicle adapted to normally limit the front vehicle wheel maximum angular displacement upon severe braking actuation.

Angular displacement limiting means are provided between a movable portion of the steering gear and a relatively fixed portion of the vehicle, and are actuated in function with a predetermined variable condition according to the vehicle braking to counteract a relatively large displacement of said movable portion of the steering gear upon severe braking actuation.

4 Claims, 2 Drawing Figures

PATENTED MAY 22 1973　　3,734,228

STEERING MECHANISM FOR A ROAD VEHICLE

This invention relates to a steering mechanism for a road vehicle provided with a braking system.

It has often been noticed that in most cases, upon severe braking actuation, an excessive angular displacement of the steering wheel results in a loss of steering of the vehicle, even when the braking system is provided with an antiskid system adapted to prevent a possible skidding of one of the vehicle wheels.

It is an object of the invention to provide a steering mechanism with means adapted to oppose a relatively large angular displacement of front vehicle wheels to avoid the resulting dangerous steering loss upon severe braking actuation.

According to the invention the steering mechanism comprises displacement opposing means controlled in response to at least one predetermined variable condition relating to the vehicle braking operation operatively provided between steering linkage means connecting the steering wheel to the front vehicle wheels and a relatively fixed portion of the vehicle for substantially opposing a relatively large displacement of said linkage means upon severe braking actuation.

According to another feature of the invention, said displacement opposing means comprise first and second relatively movable stop means operatively connected to said steering linkage means and said fixed vehicle portion respectively, one of said stop means being actuated by motor means responsive to said one variable condition to provide a relative abutment for the other stop means for thereby normally limiting the relative maximum stroke of said steering linkage means with respect to said fixed vehicle portion upon severe braking actuation.

Figure 2:
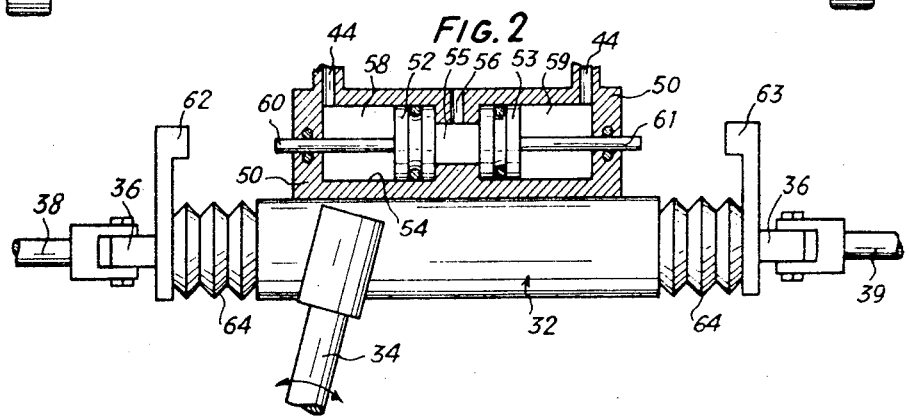

The invention will now be described with reference to the accompanying drawings in which:

FIG. 1 is a diagrammatic view of a steering mechanism according to the invention, for a vehicle provided with an anti-skid brake system, and FIG. 2 is a partial sectional view of the displacement opposing means shown in FIG. 1.

In FIG. 1, a braking pressure mechanism source 10, such as a master cylinder, is adapted to send fluid under pressure to wheel cylinders 14–15, 16–17, of front wheels 18–19 and rear wheels 20–21 of the vehicle respectively through respective passages 22 and 24, when a brake pedal 12 is depressed. An anti-skid system 26, of a known type, is provided in passage 22 to modulate the braking fluid pressure sent to the wheel cylinders 14 and 15 of front wheels 18 and 19, as a function of respective front wheels rotation speeds for instance, measured by conventional electromagnetic sensors 28 and 29, and adapted to avoid a skidding of front wheels upon severe braking actuation. A brake pressure limiting valve 30, which may be load controlled or not, is provided in passage 24 to limit at a predetermined value the braking fluid pressure sent to wheel cylinders 16 and 17 of the rear wheels 20 and 21 of the vehicle.

In the embodiment diagrammatically shown in FIG. 1, the steering linkage means connecting the steering wheel (not shown) to the vehicle front wheels 18 and 19 comprises a transmission assembly 32 of the rack and pinion type whose pinion (not shown) is connected to the steering column 34 and rack 36 to tie-rods 38,39, themselves connected to tie-levers 40,41. Angular displacement opposing means 42 secured to transmission assembly housing 32, are connected by a passage 44 to the outlet of an electro-valve 46 connected to a vacuum source such as the suction manifold (not shown) of the vehicle engine by a passage 48. The electro-valve 46 is actuated by the anti-skid system 26, as explained below, to which system it is connected by an electrical connection 49.

As shown in FIG. 2, the angular displacement opposing means 42 comprises a housing 50 suitably secured to the fixed housing of transmission assembly 32, and further comprises two opposite pistons 52 and 53 slidably mounted in a bore 54 in housing 50. A central chamber 55 defined by the two pistons 52 and 53 is connected to the atmosphere by a passage 56, and two end chambers 58 and 59 are connected to passage 44. Each piston 53 or 52 is provided with a central stem 60 or 61 extending through the bottom wall of the bore 54, said stems being adapted to cooperate with two abutment members 62 and 63 of the movable rack 36. A flexible protecting boot 64 is provided between rack 36 and transmission assembly housing 32.

The operation of the angular displacement opposing means described hereinabove is the following. Upon release of the brakes or upon smooth braking actuation, the electro-valve 46 is in its rest position and passage 44 is connected to the atmosphere so that movable stop assemblies 60–52 and 61–53 are in the position shown in FIG. 2. In that case the displacement of rack 36 and abutments 62 and 63 is absolutely free and allows a maximum angular displacement for a normal torque applied to the steering column 34.

Upon severe braking actuation, involving the use of an anti-skid system, the valve 46 is actuated by said system and connects passages 44 and 48. The resulting decrease of pneumatic pressure in chambers 58 and 59 results in moving the motor pistons 52 and 53 away from one another until they abut the bottom walls of bore 54 respectively.

The positions of free ends of stems 60 and 61 define abutments adapted to cooperate with abutments 62 and 63 to limit at a small value the displacements of steering linkage means 36 about a zero point, thus avoiding the risk of a large displacement effected by the driver during severe braking actuation. It will be understood that the action resiliently opposing a large displacement of steering linkage means 36 and consequently a large angular displacement of front wheels 18–19 is elastic and is limited to a predetermined value. This provides the driver with the possibility of obtaining a larger angular displacement by application of a torque substantially larger than normal to the steering column, in case of absolute necessity.

In the embodiment shown, the motor of the displacement opposing means 42 is a pneumatic motor but it could be a hydraulic motor actuated by an open center type electro-valve 46. In the case of a closed center type electro-valve, both piston means 52 and 53 would be hydraulically locked and it would be necessary to provide a prestressed collapsible resilient link between the abutments 60,61 and the steering linkage means 36 to have the possibility of an emergency angular displacement.

The angular displacement opposing means of FIG. 2 are provided with only one assembly of two pistons constituting the abutments 52–60, 53–61, and defining the maximal displacement of steering linage means 36. It will be understood that it is possible to provide a plurality of piston assemblies acting for instance in parallel in a telescopic arrangement, each one of said assemblies being controlled by a respective valve such as electro-valve 46, actuated as a function of the adhesion coefficient value used during the braking to define a plurality of maximal values for the displacement of steering linkage means 36 in accordance with whether said coefficient will be large, normal or small.

I claim:

1. In a vehicle having a pair of dirigible wheels, steering means for controlling said dirigible wheels, and a braking system, control means comprising:

linkage means connecting said steering means to said dirigible wheels;

means responsive to said braking system for generating an output signal when a predetermined condition exists in said braking system indicating a severe brake application; and means for opposing a substantially large displacement of said linkage means upon generation of said output signal;

said displacement opposing means including first and second relatively movable stop means operatively connected to said linkage means and to a fixed portion of the vehicle respectively, fluid motor means operatively connected to one of said stop means for urging the latter into a position where it cooperates with the other stop means to limit the displacement of said linkage means, and means responsive to said output signal for actuating said fluid motor means.

2. The invention of claim 1:

said stop means yielding to allow the maximum stroke of said linkage means whenever the force applied to said steering means urging said first and second stop means into engagement with each other exceeds a predetermined amount.

3. The invention of claim 1:

said fluid motor means including a cylinder and a piston slidable in said cylinder and connected to said one stop means, said piston cooperating with one end of the cylinder to define a chamber therebetween, said means responsive to said output signal communicating fluid pressure into said chamber to actuate said piston when said output signal is generated.

4. The invention of claim 1:

said means responsive to said braking system including means responsive to an incipient skidding condition of a corresponding vehicle wheel for generating said output signal.

* * * * *